United States Patent
Todorovic (10) Patent No.: US 8,783,412 B2
(45) Date of Patent: Jul. 22, 2014

(54) SOUND ABSORBER FOR A GAS TURBINE EXHAUST CONE, AND METHOD FOR THE PRODUCTION THEREOF

(75) Inventor: Predrag Todorovic, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 0 days.

(21) Appl. No.: 13/980,018

(22) PCT Filed: Jan. 19, 2012

(86) PCT No.: PCT/EP2012/000243
§ 371 (c)(1),
(2), (4) Date: Aug. 12, 2013

(87) PCT Pub. No.: WO2012/097998
PCT Pub. Date: Jul. 26, 2012

(65) Prior Publication Data
US 2013/0306401 A1    Nov. 21, 2013

(30) Foreign Application Priority Data

Jan. 19, 2011   (DE) .................. 10 2011 008 920

(51) Int. Cl.
| | |
|---|---|
| *F02K 1/82* | (2006.01) |
| *B64D 33/02* | (2006.01) |
| *B64D 33/04* | (2006.01) |
| *F01D 25/30* | (2006.01) |
| *F02C 7/24* | (2006.01) |
| *F02K 1/44* | (2006.01) |
| *F02C 7/045* | (2006.01) |
| *F01N 13/00* | (2010.01) |
| *F02K 1/78* | (2006.01) |
| *B64D 33/00* | (2006.01) |

(52) U.S. Cl.
CPC ............ *F01N 13/00* (2013.01); *F01D 25/30* (2013.01); *F02C 7/24* (2013.01); *F02K 1/827* (2013.01); *F02K 1/44* (2013.01); *F05D 2250/283* (2013.01); *F02C 7/045* (2013.01); *F05D 2260/96* (2013.01)
USPC .......................... 181/213; 181/214; 244/53 B (58) Field of Classification Search
USPC ......... 181/213, 288, 293, 210, 214; 244/53 B
See application file for complete search history.

(56) References Cited

U.S. PATENT DOCUMENTS

| | | | |
|---|---|---|---|
| 2,705,208 A |  | 3/1955 | Schweikert |
| 3,174,580 A | * | 3/1965 | Schulz et al. ................. 181/290 |

(Continued)

FOREIGN PATENT DOCUMENTS

| | | |
|---|---|---|
| CH | 691465 | 7/2001 |
| DE | 2402877 | 7/1974 |

(Continued)

OTHER PUBLICATIONS

English translation of International Search Report and Written Opinion from counterpart PCT App No. PCT/EP2012/000243, Jul. 2013.

(Continued)

*Primary Examiner* — Edgardo San Martin
(74) *Attorney, Agent, or Firm* — Timothy J. Klima; Shuttleworth & Ingersoll, PLC (57) ABSTRACT

A method for manufacturing a sound absorber, the outer wall of which is provided with a plurality of recesses, with funnel-like cone elements each being assigned to the recesses inside the sound absorber, said cone elements having a larger opening facing radially outwards and a smaller opening facing radially inwards, with adjacent cone elements each being provided on a strip-shaped first carrier band, with cup elements being provided radially on the inside relative to the cone elements, and each cup element receiving one cone element, with adjacent cup elements each being provided on a strip-shaped first carrier band, with the first carrier bands being arranged adjacently in a first direction, and the second carrier bands being arranged adjacently in a second direction, with the directions crossing each other and the carrier bands being joined to one another and to the outer wall to form a rigid body.

16 Claims, 10 Drawing Sheets

(56) References Cited

U.S. PATENT DOCUMENTS

| | | | |
|---|---|---|---|
| 3,819,007 A * | 6/1974 | Wirt et al. | 181/286 |
| 3,831,710 A | 8/1974 | Wirt | |
| 3,887,031 A * | 6/1975 | Wirt | 181/286 |
| 3,948,346 A * | 4/1976 | Schindler | 181/286 |
| 4,035,535 A * | 7/1977 | Taylor | 428/116 |
| 4,106,587 A | 8/1978 | Nash et al. | |
| 4,137,992 A | 2/1979 | Herman | |
| 4,189,027 A * | 2/1980 | Dean et al. | 181/286 |
| 4,231,447 A * | 11/1980 | Chapman | 181/213 |
| 4,258,822 A * | 3/1981 | Streib | 181/213 |
| 4,671,841 A * | 6/1987 | Stephens | 156/292 |
| 5,445,861 A * | 8/1995 | Newton et al. | 428/116 |
| 5,512,715 A * | 4/1996 | Takewa et al. | 181/295 |
| 5,670,758 A | 9/1997 | Borchers et al. | |
| 5,760,349 A | 6/1998 | Borchers et al. | |
| 6,268,038 B1 * | 7/2001 | Porte et al. | 428/116 |
| 6,607,625 B2 * | 8/2003 | Andre et al. | 156/169 |
| 7,311,175 B2 * | 12/2007 | Proscia et al. | 181/290 |
| 7,337,875 B2 * | 3/2008 | Proscia et al. | 181/214 |
| 7,383,679 B2 * | 6/2008 | Porte et al. | 60/226.1 |
| 7,401,682 B2 * | 7/2008 | Proscia et al. | 181/290 |
| 7,819,224 B2 | 10/2010 | Borchers et al. | |
| 8,025,122 B2 * | 9/2011 | Gilcreest et al. | 181/213 |
| 8,413,922 B2 * | 4/2013 | Porte et al. | 244/1 N |
| 2008/0308345 A1 * | 12/2008 | Borchers et al. | 181/222 |
| 2010/0276548 A1 * | 11/2010 | Porte et al. | 244/53 B |

FOREIGN PATENT DOCUMENTS

| | | | |
|---|---|---|---|
| DE | 2506472 | 8/1976 | |
| DE | 19607290 | 10/1996 | |
| DE | 102004012929 | 4/2005 | |
| EP | 1612769 | 1/2006 | |
| FR | 2925463 A1 * | 6/2009 | B64D 33/02 |
| GB | 2005384 | 4/1979 | |
| GB | 2300081 | 10/1996 | |
| WO | 2005/091272 | 9/2005 | |

OTHER PUBLICATIONS

German Search Report dated Sep. 19, 2011 from counterpart application.

International Search Report dated May 8, 2012 from counterpart application.

* cited by examiner

SOUND ABSORBER FOR A GAS TURBINE EXHAUST CONE, AND METHOD FOR THE PRODUCTION THEREOF

This application is the National Phase of International Application PCT/EP2012/000243 filed Jan. 19, 2012 which designated the U.S.

This application claims priority to German Patent Application No. DE102011008920.9 filed Jan. 19, 2011, which application is incorporated by reference herein.

This invention relates to a gas-turbine exhaust cone arranged at the outflow area of a gas turbine. Furthermore the invention relates to a method for manufacturing a sound absorber, in particular for a gas-turbine exhaust cone.

Gas turbines for aircraft engines require noise abatement. For this purpose, various measures are known to minimize the noise of the gas stream exiting from an exhaust nozzle downstream of the turbine.

From the state of the art it is known to dampen the low frequencies occurring in particular on engines with lean combustion. Noise dampening is here accomplished by means of a Helmholtz resonator. It is known to provide such a Helmholtz resonator in the inflow area of the exhaust cone, while the downstream end area of the exhaust cone is merely conceived as geometric body. Known Helmholtz resonators are here provided as a system of radial walls and inner cylindrical ducts and dimensioned in dependence of the desired frequencies.

The known designs disadvantageously require reinforcing elements as they are heavily mechanically loaded in terms of the gas temperatures occurring. Also attributable to different walls and stiffening elements, the resultant design features a relatively high weight. Additionally, manufacture thereof requires high effort and investment. Manufacturing costs are still further increased by internal acoustic measures (perforations or similar). Further, the axial length of such a resonator requires considerable installation space, adding to the weight of the arrangement.

An acoustic absorber is known from U.S. Pat. No. 5,670,758 in which a funnel-shaped element is combined with a cup. A similar design is also shown by U.S. Pat. No. 5,760,349. These designs are suitable in particular for the dampening of low frequency noise. It has proven to be a disadvantage that their manufacture is very expensive. In addition, complex three-dimensional shapes for acoustic absorbers of this type can only be achieved with difficulty or not at all. A further problem is the mounting and fastening of the individual absorber elements. There are also problems with its use in gas turbines in respect of thermal expansion and the material stress due to temperature application.

In a broad aspect, the present invention provides a sound absorber, in particular for a gas-turbine exhaust cone of the type specified at the beginning which, while being simply designed and having a high dampening effect, can be manufactured cost-effectively and is characterized by low weight, as well as a method for manufacturing said sound absorber.

It is a particular object of the present invention to provide solution to the above problems by a combination of the features described herein. Further advantageous embodiments of the present invention will become apparent from the present description.

In accordance with the invention, therefore, it is provided that the sound absorber in accordance with the present invention, which can be used for an exhaust cone in particular, includes an outer wall in which a plurality of recesses (through passages or openings in the outer wall) is provided. The recesses may be designed as individual, singular recesses, or be provided in the form of a perforation.

In accordance with the invention, a plurality of funnel-like cone elements is arranged inside the outer wall of the gas-turbine exhaust cone, said elements having a larger opening facing radially outwards and a smaller opening facing radially inwards. These individual funnel-like cone elements are preferably assigned to the recesses in the outer wall, in particular when individual singular recesses are provided. In this case, it is possible to position the funnel-like cone element exactly relative to the recess.

In accordance with the invention, it is furthermore provided that adjacent cone elements are each arranged on a strip-shaped first carrier band. The cone elements can be manufactured here by either a forming operation or a stamping operation directly from the material of the strip-shaped first carrier band. It is also possible to produce the funnel-like cone elements separately and to join them to the carrier band, with the carrier band then having appropriate recesses to enable the sound to enter the funnel-like cone elements.

The gas-turbine exhaust cone in accordance with the invention furthermore provides that cup elements are arranged radially on the inside relative to the cone elements and each cup element receives one cone element. The cone elements and the cup elements are matched to one another and dimensioned to cope with the frequency or frequencies to be absorbed. Adjacent cup elements are, similarly to the cone elements, each arranged on a strip-shaped second carrier band. Here too it is possible to stamp the cup elements using a forming operation out of the carrier element or to manufacture the cup elements separately and to join them to the second carrier band, where the second carrier band must then have appropriate recesses for inserting the cone elements into the cup elements.

Furthermore it is provided in accordance with the invention that the first carrier bands are arranged adjacently to one another in a first direction and the second carrier bands are arranged adjacently to one another in a second direction, where the directions cross and the carrier bands are joined to one another and to the outer wall in order to form a rigid body. The first and second carrier bands thus allow the individual cone elements and cup elements to be assigned to one another. The intersecting or overlapping arrangement of the carrier bands also results in an inherently stable overall structure which is simple and inexpensive to manufacture. The use of a separate outer wall can if necessary be dispensed with, since it can be provided by the joined first carrier bands.

With the embodiment in accordance with the invention, it is possible to manufacture complex three-dimensional structures for the gas-turbine exhaust cone, for example not only cylindrical absorber elements, but also conical, frustum-shaped or cone-shaped ones.

In a favourable development of the invention, it is provided that the carrier bands are arranged at an angle to a central axis of the gas-turbine exhaust cone. This results in a stiff structure which can both absorb thermal stresses and withstand forces or vibrations acting on it.

The cone elements preferably have, in the radial direction, a height which is less than the depth of the cup elements, such that the sound waves entering through the cone elements can enter the cup element.

In a favourable development of the invention, it can be provided that a honeycomb-structured layer is formed in the area of the outer wall, where the outer wall can in a preferred embodiment be designed double-walled with a honeycomb layer arranged in between. This makes it possible to additionally achieve dampening or absorption of high-frequency vibrations.

To create an inherently stable overall structure, it may be favourable when the carrier bands are at their end areas each connected to a flange. It is thus possible to join together the gas-turbine exhaust cone from individual segments, for example from a cylindrical and a cone-shaped element.

In a favourable development, it can furthermore be provided that stiffening elements are arranged radially inside the structure formed by the joined second carrier bands, said stiffening elements being preferably elongated in design and supporting the cup elements. The stiffening elements are preferably arranged between adjacent rows of cup elements. This design leads to an additional stiffening of the overall structure and can help to improve vibration absorption for larger cup elements in particular, since the side walls and the bottom of the cup elements can be additionally braced.

The cone elements and cup elements in accordance with the invention can be provided in the axial direction of the gas-turbine exhaust cone either over its entire length or over an axial partial area of the overall length.

The present invention is described in the following in light of the accompanying drawing, showing exemplary embodiments. In the drawing.

Figure 1:
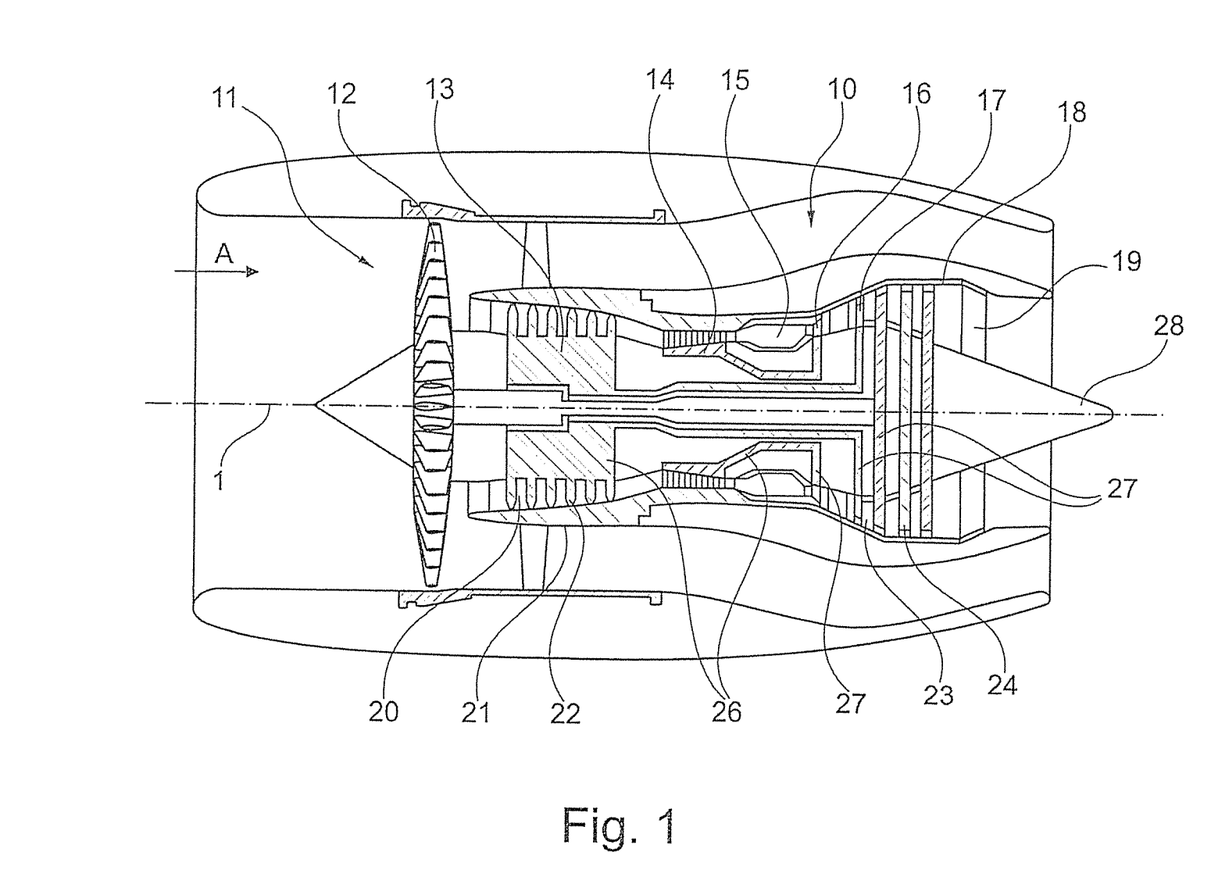
FIG. 1 shows a schematic representation of a gas-turbine engine in accordance with the present invention.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 1 shows a gas-turbine exhaust cone with reference numeral 28.

Figure 2:
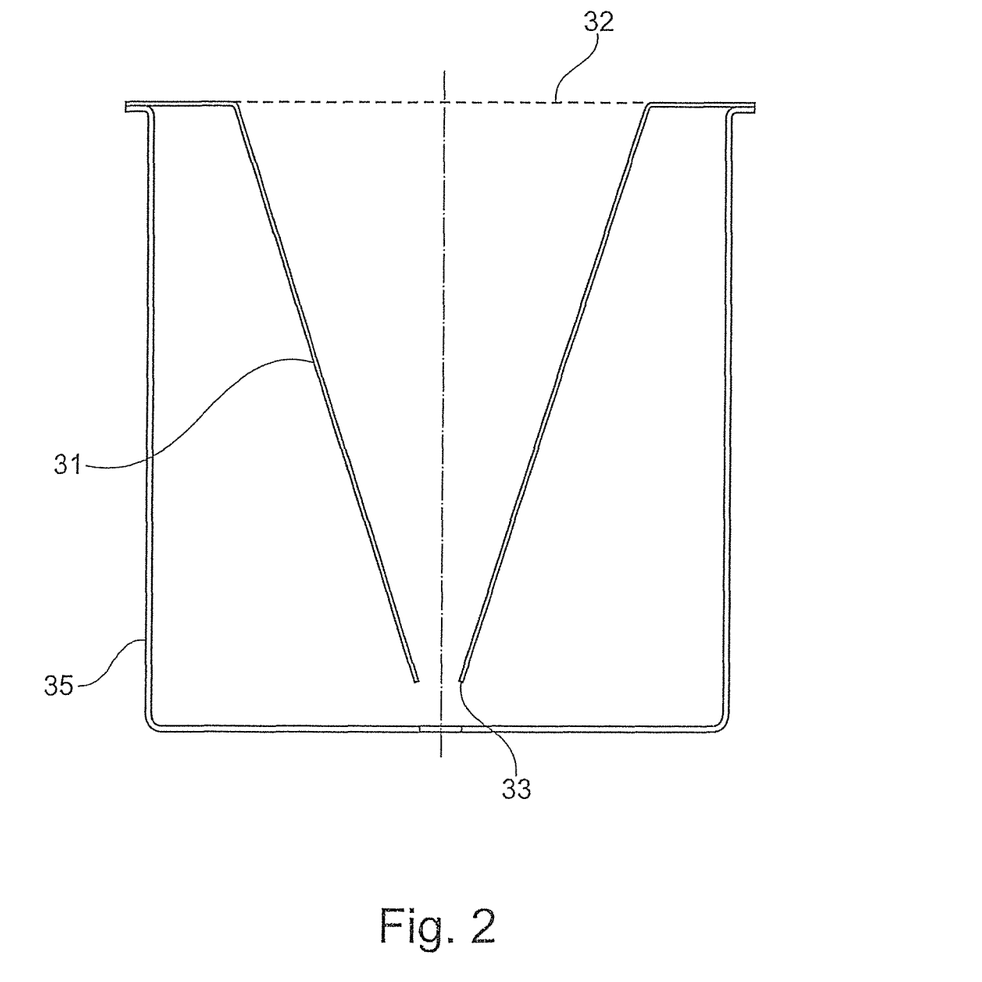
FIG. 2 shows a schematic representation of a sound absorber having a funnel-like cone element and a cup element.

FIG. 2 shows in a schematic representation an acoustic absorber as designed and used in accordance with the invention. The acoustic absorber includes a funnel-like cone element 31 having a radially outer opening 32 (upper opening according to FIG. 2) which is larger than a radially inner opening 33. FIG. 2 furthermore shows that the funnel-like cone element 31 is arranged in a cup element 35, where the opening 33 is at a distance from the bottom of the cup element 35. Sound waves can thus enter the funnel-like cone element 31 and pass through the opening 33 into the interior of the cup element 35. As a result, low frequencies in particular are absorbed.

Figure 3:
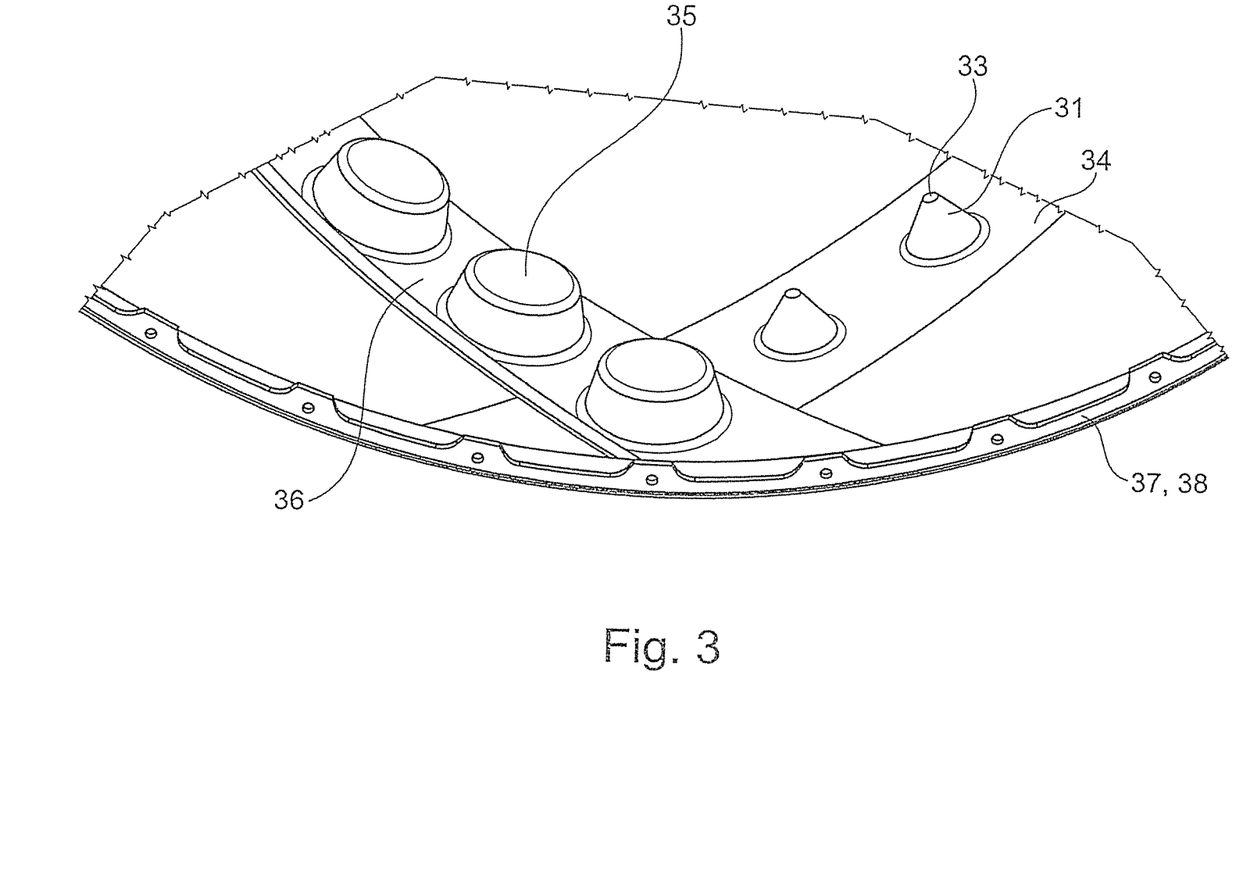
FIG. 3 shows a perspective partial view of an exemplary embodiment of the gas-turbine exhaust cone in accordance with the present invention illustrating the assignment of the carrier bands.
Figure 4:
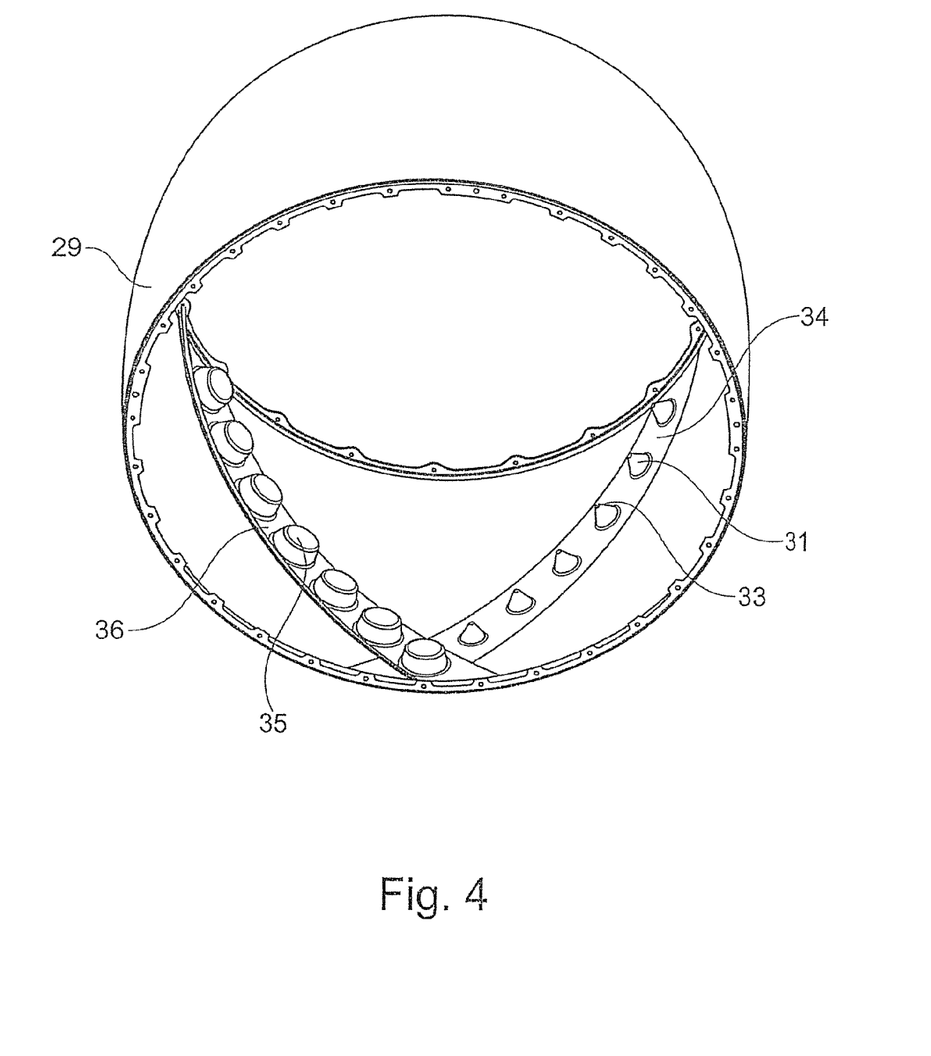
FIG. 4 shows a view, by analogy with FIG. 3, FIGS. 5, 6 show perspective partial views of the respective carrier bands with cone elements and cup elements.

FIGS. 3 and 4 each show perspective partial views. It can be discerned here that the individual funnel-like cone elements are arranged or provided on a first carrier band 34, while the cup elements 35 are arranged or provided on a second carrier band 36. The dimensioning and the spacing of the central axes of the cone elements 31 and of the cup elements 35 are selected such that the two carrier bands 34 and 36 can be mounted one on top of the other and crossing each other to form the dampening element or absorption element shown in FIG. 2. Furthermore, FIGS. 3 and 4 show a front flange 37 and a rear flange 38.

Figure 5:
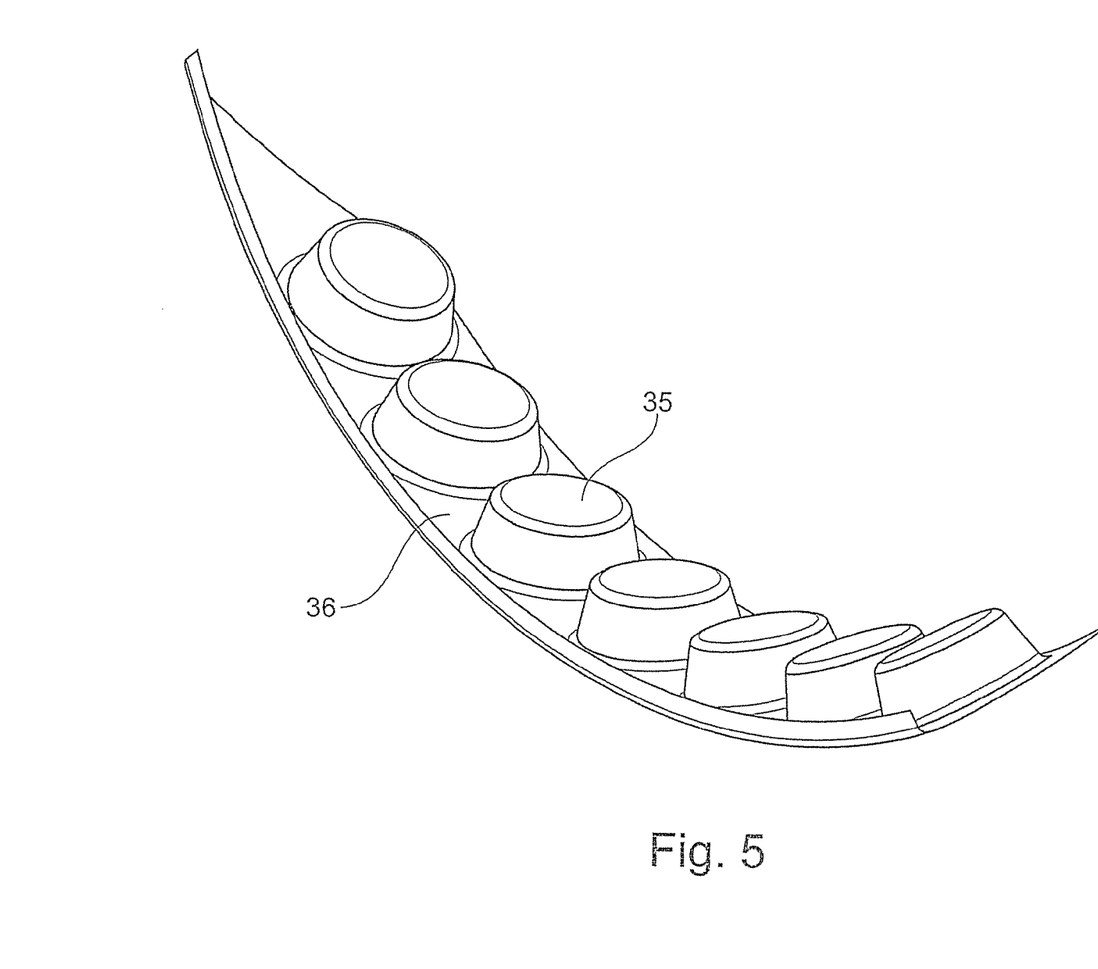
Figure 6:
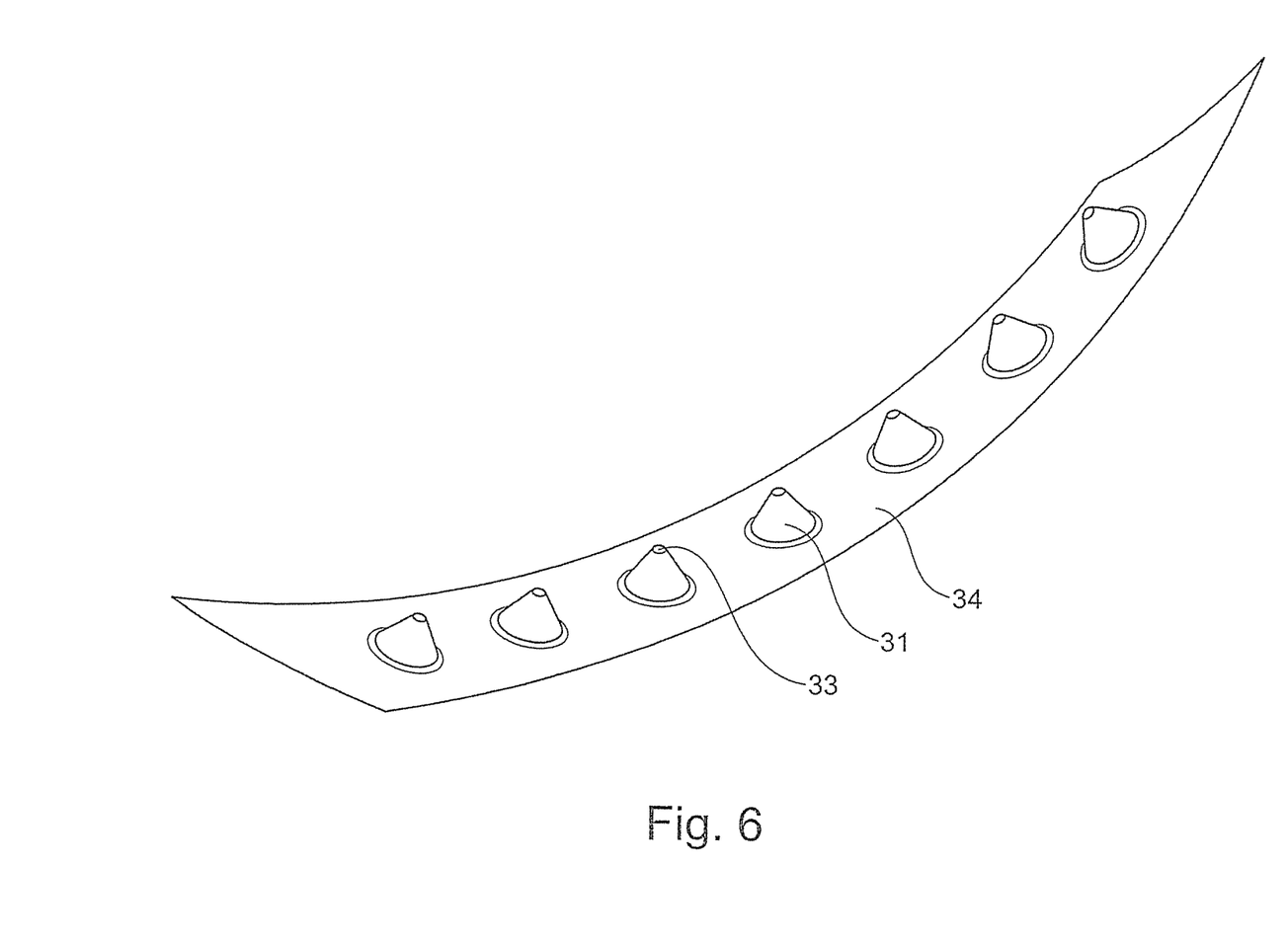

The carrier bands 34 and 36 with the associated funnel-like cone elements 31 and cup elements 35 are shown again in FIGS. 5 and 6 in an enlarged perspective partial view. The result of this is that the carrier bands 34, 36 can either be designed flat and strip-shaped or have a flanged rim.

Figure 7:
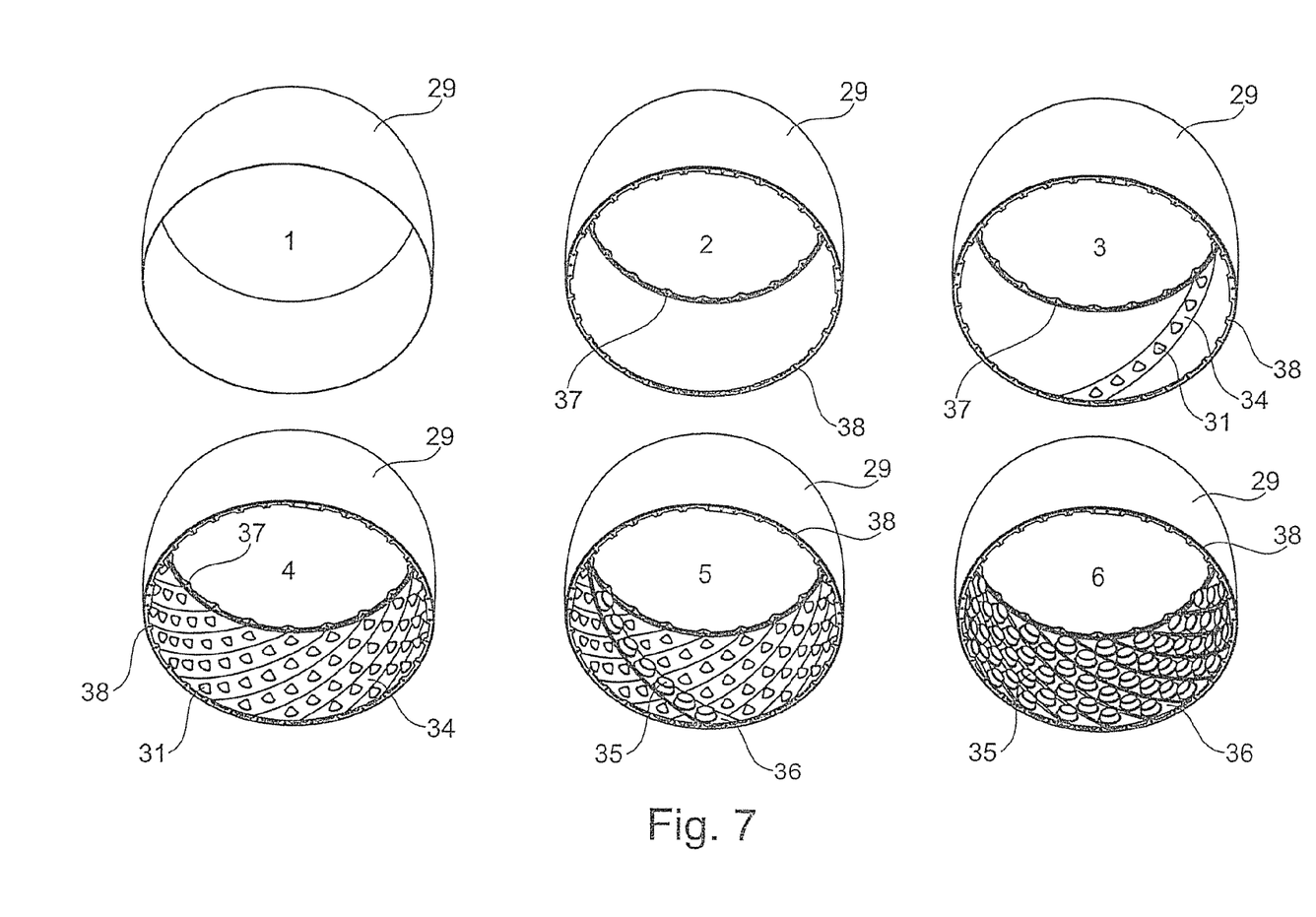
FIG. 7 shows a schematic sequence of the manufacturing process of the acoustic absorber in accordance with the present invention.

FIG. 7 shows the mode of manufacture of the gas-turbine exhaust cone in accordance with the invention. Illustration 1 in FIG. 7 shows schematically an outer wall 29 which can be designed crowned or slightly cone-shaped and has a circular cross-section. In step 2 of FIG. 7, the flanges 37 and 38 are fastened to the outer wall 29 by means of a suitable joining method, for example by welding or brazing or in another suitable manner. In a favorable development of the invention, it can be provided that a honeycomb-structured layer is formed in the area of the outer wall 29, where the outer wall 29 can in a preferred embodiment have double walls 40 and 42 with a honeycomb layer 44 arranged in between. This makes it possible to additionally achieve dampening or absorption of high-frequency vibrations.

In step 3 of FIG. 7, first carrier bands 34 are inserted and connected to the flanges 37 and 38. The individual carrier bands 34 are arranged parallel to one another, as shown in step 4 of FIG. 7. The result is thus a closed and inherently stable form, since the individual carrier bands are joined both to the flanges 37 and 38 and to one another.

In a subsequent step 5 as per FIG. 7, second carrier bands 36 are placed onto the inside of the first carrier bands 34 and carry the cup elements 35. The cup elements 35 thus receive the individual funnel-like cone elements 31 with second carrier band 36 crossing several first carrier bands 34. The second carrier bands 36 too are joined both to one another and to the flanges 37 and 38, such that the structure shown in step 6 of FIG. 7 is obtained with the second carrier bands 36 and first carrier bands 34 crossing each other.

It is understood that in accordance with the invention, the actual formation of the outer wall 29 can be dispensed with, since the joined-together first carrier bands 34 can already form a sufficiently stable outer wall once they have been joined together.

Figure 8:
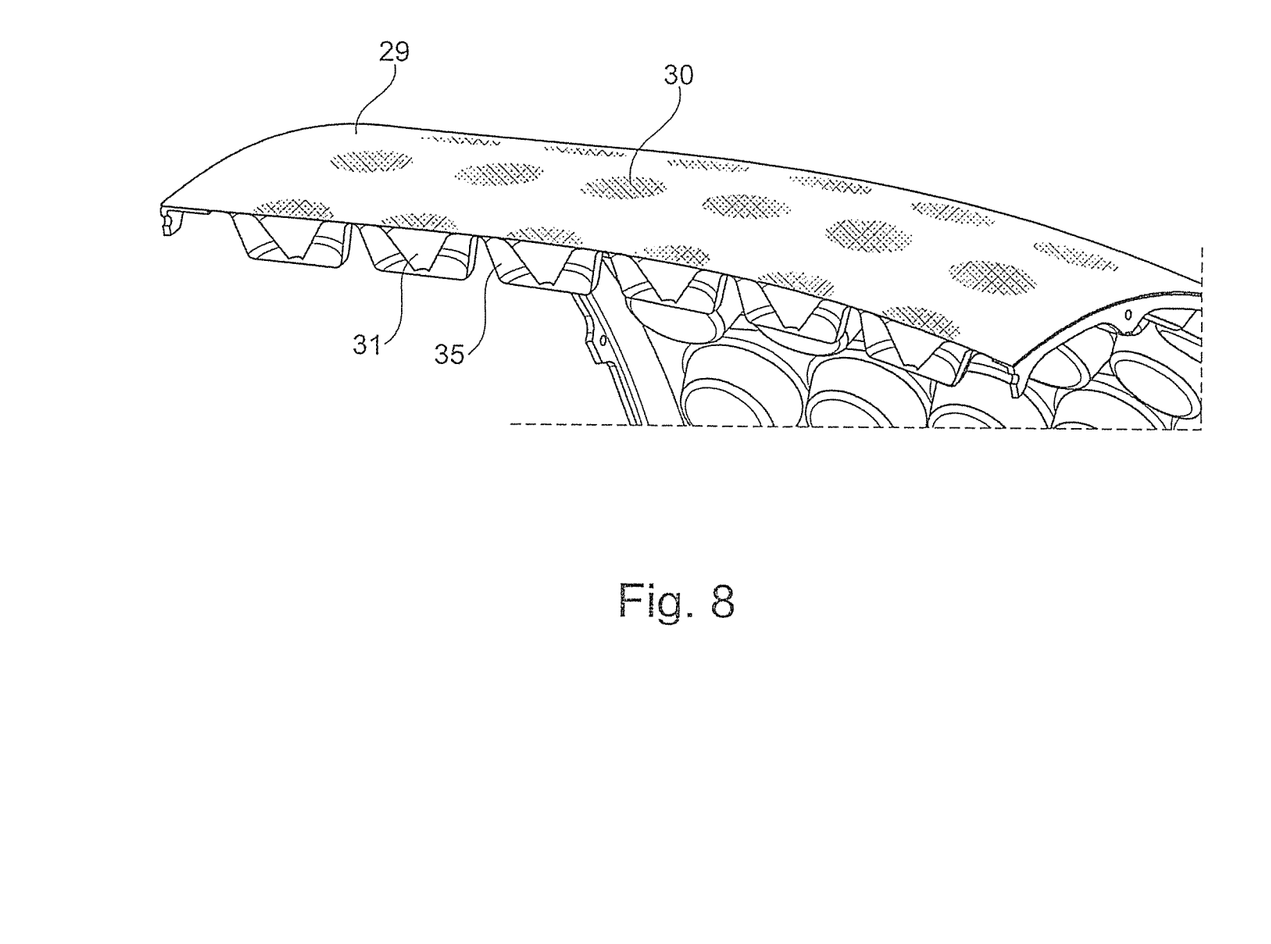
FIG. 8 shows a perspective partial view onto the outside of the absorber.

FIG. 8 shows a perspective partial view of the completed wall of the gas-turbine exhaust cone or acoustic absorber in accordance with the invention. In particular, recesses 30 (through passages or openings in the outer wall 29) can be discerned here which are provided as singular recesses and matchingly assigned to the individual cone elements 31. The recesses 30 can be provided in the outer wall 29. If a physical outer wall 29 is dispensed with, the recesses result from the recesses provided in the first carrier bands 34.

Figure 9:
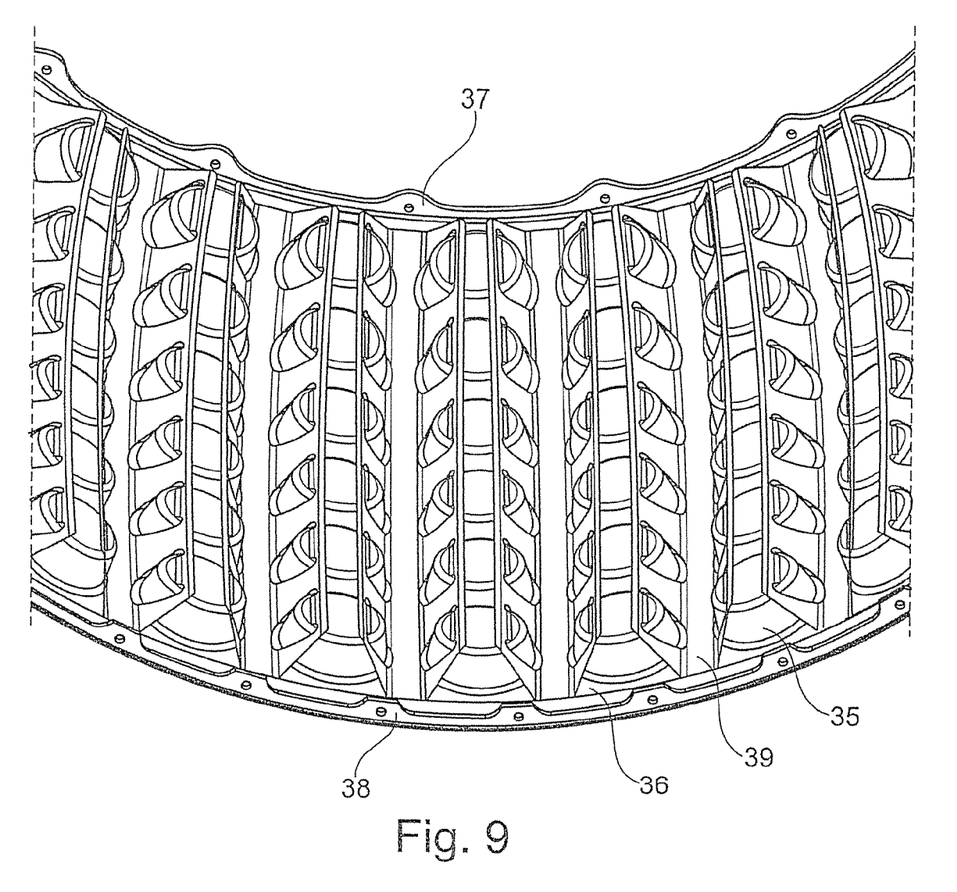
FIG. 9 shows a perspective partial view onto the inside with additional stiffening elements.
Figure 10:
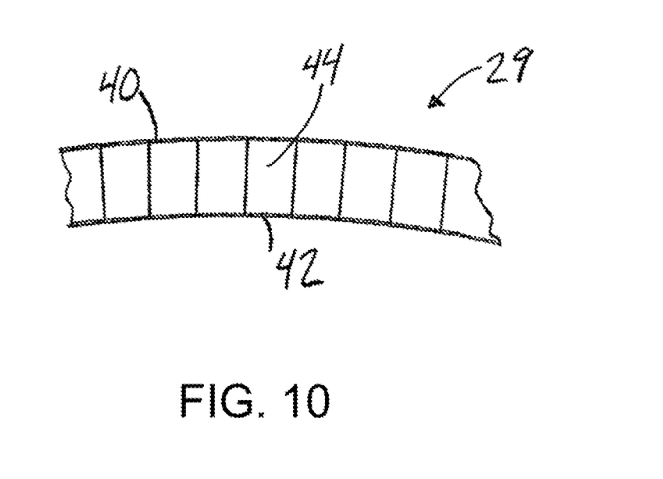
FIG. 10 shows a schematic side view of an outer wall of the gas-turbine exhaust cone.

FIG. 9 shows a perspective internal view of a further exemplary embodiment, where additional elongated stiffening elements 39 are inserted, which are joined to the cup elements 35 and/or to the second carrier bands 36 to achieve an additional stabilization of the structure.

LIST OF REFERENCE NUMERALS

1 Engine axis/central axis
10 Gas-turbine engine
11 Air inlet
12 Fan rotating inside the casing
13 Intermediate-pressure compressor
14 High-pressure compressor
15 Combustion chambers
16 High-pressure turbine
17 Intermediate-pressure turbine
18 Low-pressure turbine
19 Exhaust nozzle
20 Guide vanes
21 Engine casing/cowling
22 Compressor rotor blades
23 Stator vanes
24 Turbine blades
25 Compressor drum or disk
26 Turbine rotor hub
27 Exhaust cone
28 Outer wall
29 Recess
30 Funnel-like cone element
31 Opening
32 Opening
33 First carrier band
34 Cup element
35 Second carrier band
36 Front flange
38 Rear flange
39 Stiffening element

What is claimed is:

1. A method for manufacturing a sound absorber,
providing an outer wall for the sound absorber having a plurality of through passages;
providing a plurality of funnel-like cone elements each being assigned to certain of the plurality of through passages inside the sound absorber, the cone elements having a larger opening facing radially outwards and a smaller opening facing radially inwards, with a quantity of the cone elements being provided adjacent to one another longitudinally along each of a plurality of strip-shaped first carrier bands;
providing a plurality of cup elements on a radially interior side of the cone elements, with each cup element receiving only one cone element, and with a quantity of the cup elements being provided adjacent to one another longitudinally along each of a plurality of strip-shaped second carrier bands;
arranging the plurality of the first carrier bands side-by-side to one another and skewed in a first direction with respect to an axis of the sound absorber;
arranging the plurality of the second carrier bands side-by-side to one another and skewed in a second direction with respect to the axis of the sound absorber, with the first and second directions crossing each other such that each first carrier band crosses a plurality of second carrier bands and each second carrier band crosses a plurality of first carrier bands;
joining the carrier bands to one another and to the outer wall in order to form a rigid body.

2. The method of claim 1, and further comprising manufacturing at least one chosen from the cone elements and the cup elements by forming the at least one chosen from the cone elements and the cup elements integrally with the respective carrier band.

3. A gas-turbine exhaust cone, comprising:
an outer wall including a plurality of through passages;
a plurality of funnel-like cone elements each being assigned to certain of the plurality of through passages inside the gas-turbine exhaust cone, the cone elements each having a larger opening facing radially outwards and a smaller opening facing radially inwards,
a plurality of strip-shaped first carrier bands, each of which has a longitudinal extension and on each of which a quantity of the cone elements are provided adjacent to one another along the longitudinal extension;
a plurality of cup elements being provided radially on an inside relative to the cone elements, each cup element receiving only one cone element;
a plurality of strip-shaped second carrier bands, each of which has a longitudinal extension and on each of which a quantity of the cup elements are provided adjacent to one another along the longitudinal extension;
the first carrier bands being arranged side-by-side to one another and skewed in a first direction with respect to an axis of the exhaust cone;
the second carrier bands being arranged side-by-side to one another and skewed in a second direction with respect to the axis of the exhaust cone;
the first and second directions crossing each other such that each first carrier band crosses a plurality of second carrier bands and each second carrier band crosses a plurality of first carrier bands;
the first and second carrier bands being joined to one another and to the outer wall to form a rigid body.

4. The gas-turbine exhaust cone of claim 3, wherein at least one chosen from the cone elements and the cup elements are integrally formed with the respective carrier bands.

5. The gas-turbine exhaust cone of claim 3, wherein the outer wall includes a plurality of through passages associated with each cone element.

6. The gas-turbine exhaust cone of claim 3, wherein the outer wall includes double walls and a honeycomb-structured layer arranged between the double walls.

7. The gas-turbine exhaust cone of claim 3, and further comprising stiffening elements arranged radially inside the joined second carrier bands, the stiffening elements being elongated in design and supporting the cup elements, and, being arranged between adjacent rows of cup elements.

8. The gas-turbine exhaust cone of claim 3, wherein the cone elements and the cup elements are provided in an axial direction at partial areas along a length of the gas-turbine exhaust cone.

9. An acoustic absorber including a gas-turbine exhaust cone in accordance with claim 3.

10. The gas-turbine exhaust cone of claim 3, wherein at least one chosen from the cone elements and the cup elements are separate parts joined to respective carrier band provided with second through passages.

11. The gas-turbine exhaust cone of claim 3, wherein the cone elements each have, in a radial direction, a height which is less than a depth of each of the cup elements.

12. The gas-turbine exhaust cone of claim 3, wherein the outer wall includes a single through passage associated with each cone element.

13. The gas-turbine exhaust cone of claim 3, wherein the cone elements and the cup elements are provided in an axial direction essentially along an entire length of the gas-turbine exhaust cone.

14. The gas-turbine exhaust cone of claim 3, wherein the outer wall includes a flange at each end and end areas of the carrier bands are connected to adjacent flanges.

15. The method of claim 1, and further comprising providing stiffening elements arranged radially inside the joined second carrier bands, the stiffening elements being elongated in design and supporting the cup elements, and arranging the stiffening elements between adjacent rows of cup elements.

16. The method of claim 1, and further comprising forming the at least one chosen from the cone elements and the cup elements as separate parts and joining the at least one chosen from the cone elements and the cup elements to the respective carrier band provided with second through passages.

* * * * *